United States Patent [19]

Sims, Jr.

[11] 3,838,449

[45] Sept. 24, 1974

[54] METHOD AND SYSTEM FOR DIGITAL RECORDING

[75] Inventor: John C. Sims, Jr., Dusbury, Mass.

[73] Assignee: New England Research Associates, Inc., Bedford, Mass.

[22] Filed: Mar. 13, 1973

[21] Appl. No.: 340,782

[52] U.S. Cl. .......................... 360/52, 360/32, 360/48

[51] Int. Cl.. G11b 15/20, G11b 27/34, G11b 31/00

[58] Field of Search ...... 179/100.2 B, 100.2 S, 100.2 MD, 340/174.1 G, 174.1 K, 172.5, 178/31

[56] References Cited

UNITED STATES PATENTS

| | | | |
|---|---|---|---|
| 3,413,626 | 11/1968 | Smith et al. | 340/174.1 G |
| 3,474,429 | 10/1969 | McCowen et al. | 340/174.1 G |
| 3,506,814 | 4/1970 | Macdonald et al. | 179/100.2 B |
| 3,582,922 | 6/1971 | Greshel | 179/100.2 B |
| 3,646,534 | 2/1972 | Miller | 179/100.2 MD |
| 3,685,031 | 8/1972 | Cook | 179/100.2 S |
| 3,757,309 | 9/1973 | Hashizume et al. | 340/174.1 G |

*Primary Examiner*—Alfred H. Eddleman
*Attorney, Agent, or Firm*—Browne, Beveridge, De Grandi & Kline

[57] ABSTRACT

A method and system for digital character-by-character or incremental recording in which the spaces of the data signals are recorded instead of the marks to prevent a velocity modulated signal from being recorded in the interrecord gaps. The signal recorded is a pulse carrier signal which is generated in correspondence with the spaces of the data signal. An environmental water monitoring apparatus for character-by-character recording of a digital word indicative of analog measurements taken by a plurality of sensors which are periodically monitored.

20 Claims, 4 Drawing Figures

METHOD AND SYSTEM FOR DIGITAL RECORDING

The present invention relates to a method and system for digital recording. More particularly, the present invention relates to a method and system for digital character-by-character or incremental recording in which the spaces of a standard teletype signal are asserted instead of the marks to prevent a velocity modulated signal from being recorded in the inter-record gaps. The information signal recorded on tape is a pulsed carrier signal which enables playback directly through a low-cost tape recorder and through the telephone lines.

When recording a digital signal such as a standard teletype signal on tape, conventional computer technology would lead us to assert the marks. In a teletype signal, however, the line is in the marking or "one" state between characters and if the "ones" of a teletype signal are asserted and if the tape is stopped between characters as is done in incremental recording a velocity modulated signal would be recorded in the inter-record gap. Since the playback logic of a digital recording system is arranged to be responsive only to marks and spaces, the velocity modulated signal would not be properly interpreted and would cause a logic malfunction.

Additionally, it is frequently desirable to playback a digital signal recorded on tape through an ordinary low-cost tape playback unit. Also, it may be desirable to be able to play a recorded digital signal through the telephone lines without the use of relatively expensive commercially available modems. For instance, it may be necessary to transmit digitally recorded data over the telephone lines to a centrally located computer for processing on a time-sharing basis.

It is therefore an object of the invention to provide a method and system for digital recording.

It is a further object of the invention to provide a digital recording method and system in which the spaces instead of the marks are asserted.

It is still a further object of the invention to provide a method and system for recording a digital signal which can be played back directly through an ordianry tape playback unit and through the telephone lines.

It is still a further object of the invention to provide a method and system for recording a teletype signal.

It is still a further object of the invention to provide an environmental water monitoring method and system.

The above objects are accomplished by providing digital signals indicative of characters in parallel form and providing a parallel-to-serial converter means to which the signals are inputted at the same time that the tape is started. The bits are then outputted from the converter means under the control of a clock as a series of marks and spaces which are fed to an inverter means which provides output signals in correspondence with the spaces. The output of the inverter means is fed to a coincidence detector along with a clock signal having a frequency of several times the baud rate. The output of the coincidence detector is a pulsed carrier signal which is recorded on the tape. During playback the signal is demodulated by a resettable one-shot multivibrator which provides an output signal having the same form as the original serial data signal.

The invention will be better understood by referring to the detailed description below in conjunction with the drawings in which.

Figure 2A:
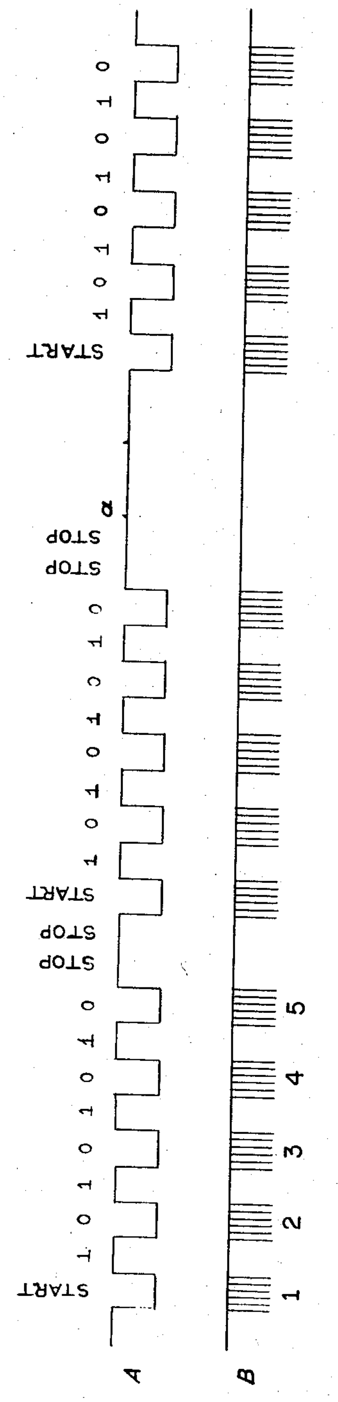
FIGS. 2A and 2B show waveforms generated when recording and playing back by the method of the invention.

One of the salient principles of the invention is best illustrated with respect to FIG. 2A. On line A of that Figure three groups of digital signals in standard teletype ASCII (American Standard Code for Information Exchange) code are shown. In the case shown the three groups of signals are identical and represent the character U in the ASCII code. The code is comprised of 11 bit times or "baud" with the first bit or start bit by convention always being a space, the last two bits or stop bits by convention always being marks, and the intervening eight bits being unique combinations of marks and spaces corresponding to particular characters. In FIG. 2A it is seen that the code for the letter U is 10101010.

In an incrementally operated tape recorder system there is a means provided for stopping the tape after the last stop bit of each character. If, however, as in the case of the first two signal groups in FIG. 2A, one character immediately follows the next, the tape will be started before it has had a chance to stop and there will be no stopping of the tape between characters. If, on the other hand, as in the case of the second and third signal groups of FIG. 2A, there is an interval between the final stop bit of a character and the start bit of the next character, the tape will slow down substantially and actually stop if the interval is long enough. The interval between the end of the last stop bit (point a in FIG. 2A) and the beginning of the first start bit of the next character is referred to herein as the inter-record gap and according to convention the signal remains in the marking state in the inter-record gap. If, therefore, the marks are asserted and recorded on the tape, as is done in conventional computer technology because of the slowing down and stopping of the tape the recorded signal will be velocity modulated in the inter-record gap and may not be properly interpreted by the playback logic which is ordinarily arranged to be responsive only to marks and spaces. The present invention therefore provides a method and system in which the spaces instead of the marks are asserted and in which the aforementioned deficiency is overcome.

Figure 1:
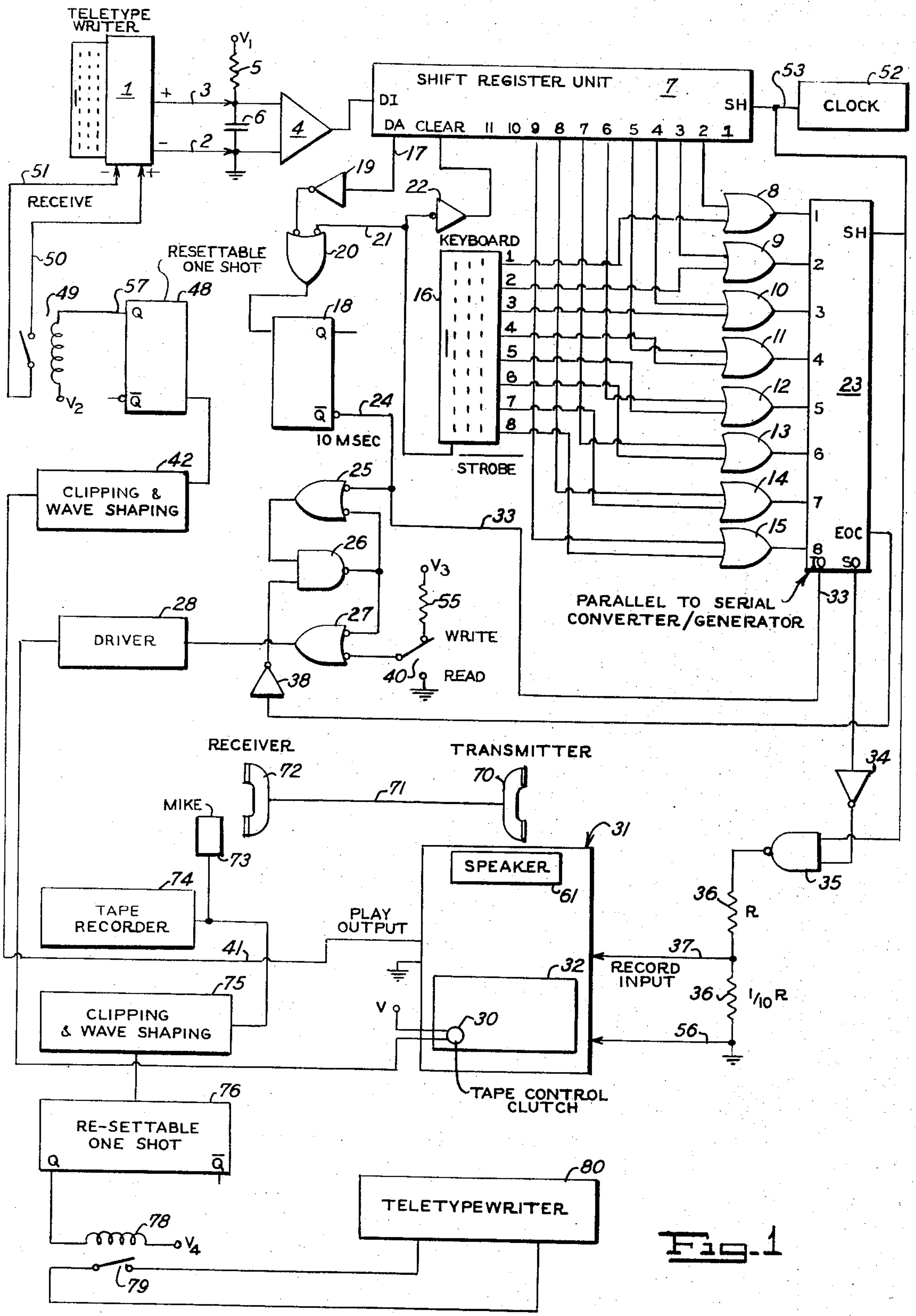
FIG. 1 shows a block diagram of a first embodiment of the invention.

Referring to FIG. 1 teletypewriter 1 has send output lines 2 and 3 and receive input lines 50 and 51. Teletypewriter 1 is a standard teletypewriter known to those skilled in the art and arranged to generate a unique coded pulse group on lines 2 and 3 such as shown in FIG. 2A and discussed above for each key depressed. The teletypewriter is further arranged to decode an incoming pulse train on lines 50 and 51 to automatically cause appropriate keys to be depressed and a message to be typed.

Teletypewriter 1 manifests the spaces and marks shown in FIG. 2A as contact openings and closings respectively of output lines 2,3. Line 3 is connected to voltage source $V_1$ through resistor 5. Hence, each time the lines 2,3 open in response to a space bit, the current goes low while each time the lines 2,3 close in response to a mark bit the current goes high. A capacitor 6 is connected across lines 2 and 3 to minimize the effect of contact bounce.

Level converter 4 changes the marking level to be compatible with the input of shift register unit 7 to which the output signals of lever converter 4 are fed. In the embodiment shown unit 7 has at least 11 storage positions to accomodate the eleven bits of the teletype signal, positions two to nine which correspond to the positions of the information bits of the teletype signal having output lines connected thereto. Unit 7 may be the receiver portion of a universal asynchronous receiver and transmitter such as the General Instrument AY-5-1012.

Clock 52 is a free-running clock such as an astable multivibrator and as discussed below, is arranged to generate clock pulses at a frequency within the band pass range of both an ordinary tape recorder and the telephone lines. In a preferred embodiment of the system shown in FIG. 1, a frequency of 1,760 HZ or 16 times the standard baud rate of 110 bits per second for the teletypewriter is used.

The output pulses from level converter 4 are inputted to the data input, DI, of unit 7 and are shifted by the clock pulses which are inputted to the shift terminal, SH, of unit 7. After all of the bits of the signal have been shifted into unit 7 a signal appears at the data available output of the unit DA.

In addition to a teletypewriter input, the system is also designed to accomodate a keyboard input. The output of standard keyboard 16 is in parallel form as opposed to series form. The eight information signals comprising the code of the character corresponding to the key depressed are outputted on output lines 1 through 8 and if desired, the keyboard may be arranged to have eleven output lines with a start space bit always on the first line and stop mark bits always on the tenth and eleventh lines. Additionally, keyboard 16 has a strobe output which indicates when data is present at all of the outputs of the keyboard. In the embodiment shown, the strobe output is an inverted output so that no signal appears when all of the outputs of the keyboard are present. This no-signal indication is fed to inverter 22 which in turn feeds a signal to the clear input of unit 7 thereby insuring that the bit positions of unit 7 are cleared when the keyboard is being used.

The data available output of unit 7 is fed on line 17 to inverter 19, the output of which is fed to one of the inputs of inverted input OR gate 20. The strobe output of keyboard 16 is fed on line 21 to the other input of inverted input OR gate 20. Hence, when either data is available from unit 7 or unit 16 an output signal is present at the output of OR gate 20. Monostable multivibrator 18 is a standard monostable multivibrator as known to those skilled in the art and is arranged to generate a negative going pulse on output line 24, which in the preferred embodiment of the invention has a duration of 10 milliseconds when an input is received from OR gate 20. Each time monostable multivibrator 18 is operated, an output pulse on line 24 is presented to an input of inverted input OR gate 25. Inverted input OR gate 25 NAND gate 26 are connected in a loop to form a latch. The leading edge of the negative going pulse on line 24 causes the latch 25, 26 to set thereby causing the output signal of element 26 which is fed to inverted input OR gate 27 to go low. The other input to OR gate 27 is a voltage signal from source $V_3$ when read/write switch 40 is in the write position. Hence, when the output of element 26 goes low, OR gate 27 generates an output signal which provides an input signal to driver 28. Driver 28 may, for instance, be a pair of Darlington-connected transistors and the output of driver 28 operates a tape clutch 30 on a tape recorder 31 which in the preferred embodiment of the invention is a cassette player. The activation of the tape clutch 30 causes the tape in tape cassette 32 to start moving. The tape clutch 30 is operative to bring the tape up to full speed in less than 10 milliseconds and for a more detailed description of the recorder start/stop mechanism, see copending application Ser. No. 322,808, filed Jan. 11, 1973, now U.S. Pat. No. 3,790,055, assigned to the same assignee as the present application.

The outputs of OR gates 8 to 15 are connected to the eight data input terminals of parallel to serial converter/generator 23. Unit 23 is arranged so that a negative going signal at input IO causes the data at gates 8 to 15 to be shifted into the unit and so that a positive going signal at input IO causes the data to be shifted out of the unit at output SO in serial form in accordance with clock pulses inputted at input SH. Unit 23 may, for instance, be the transmitter portion of a universal asynchronous receiver and transmitter such as the General Instrument AY-5-1012.

The negative going edge of the negative pulse generated on lines 24 and 33 causes the outputs of OR gates 8 to 15 to be entered to the storage positions of unit 23. The positive going edge at the termination of the pulse is operative to shift data bits out of the unit at output SO in correspondence with pulses inputted at input SH. The generator or converter/generator 23 generates a start space bit before the eight data bits outputted and two stop mark bits after the data bits so as to reconstruct the original teletype signal. In the alternative, all eleven outputs of shift register unit 7 can be fed to unit 23 as well as the eleven outputs from keyboard 16 discussed above.

Figure 2B:
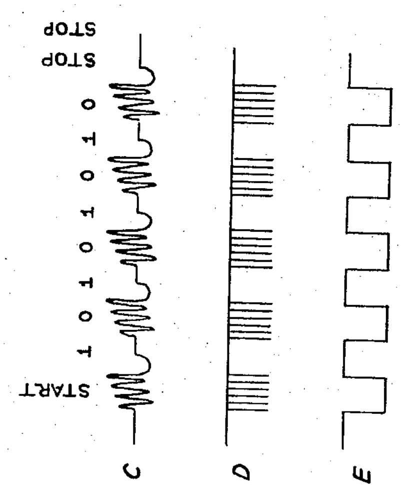

The output pulse train from output so is inverted by inverter 34 to cause the spaces to be true and the marks false. The inverted signal is fed to NAND gate 35 where it is gated against the clock signal fed to the other input of gate 35. The result of this gating is to produce a carrier output which is present for spaces and absent for marks the carrier frequency being equal to the pulse rate of clock 52. This output signal is represented at ling B of FIG. 2 where for convenience of illustration only six pulses are shown for each space. The output of gate 35 is attenuated in attenuator network 36 and is fed on lines 37 and 56 to the recording head of tape recorder unit 31.

After all of the information corresponding to a character has been fed out of unit 23, an output signal is generated on end of character output EOC which is fed through inverter 38 to one of the inputs of NAND gate 26 to re-set the latch 25, 26 and stop the tape. If there is no interval between pulse groups representative of successive characters on lines 2, 3 then output DA of shift register unit 7 will generate a signal almost immediately after the first pulse group is recorded and the latch may only remain re-set for nano-seconds with the effect that the tape will not stop.

The recording signal is thus shown at line B of FIG. 2A and it is seen that a separate signal is recorded in response to the occurrence of each space of the data signal. On line B the separate recording signals are marked 1, 2, 3, 4 and 5. If, however, there is an interval between pulse groups the tape will stop, but because spaces instead of marks were asserted there will be no velocity modulated signal recorded in the inter-record gap.

In order for the data recorded on the tape to be read back, write/read switch 40 is switched to the read position which causes the recorder clutch to stay activated and run the tape continuously. Line 41 is connected to the tape recorder read head and signals on line 41 typically have a shape as shown on line C of FIG. 2B. This signal is fed to clipping and wave shaping unit 42 which provides a signal as on line D of FIG. 2B. The details of clipping and wave shaping unit 42 are known to those skilled in the art. The signal shown on line D is a modulated signal identical to that shown on line B of FIG. 2A and is fed to resettable one-shot multivibrator 48. The period of resettable one-shot multivibrator 48 is arranged to be greater than the time between adjacent clock pulses of the signal of line D. The first clock pulse sets the one-shot multivibrator causing an output signal to be generated on line 57. Because of the period of the resettable one-shot, each successive clock pulse re-sets the multivibrator, causing line 57 to remain high. Line 57 remains high until the last clock pulse of the first data bit passes and there is no further pulse to re-set the multivibrator which then returns to its original state. The output on line 57 is thus the original data signal and is shown on line E of FIG. 2B.

Teletypewriter 1 has a receive voltage source therein (not shown) which is connected between lines 50, 51. When the switch of relay 49 is opened this voltage source generates a space input signal on lines 50, 51 and when the switch is closed a mark or one signal is generated. The signal on line 57 is fed to the coil of relay 49 to close the relay switch on the marks and to open it on the spaces.

If it is desired to transmit the recorded information over the telephone lines, telephone transmitter 70 is placed adjacent to speaker 61 of tape recorder 31. Since the recorded signals fall within the band pass of the telephone lines they will be transmitted over lines 71 to telephone receiver 72. A microphone 73 is placed adjacent to receiver 72 and the output thereof may be utilized in any number of ways known to those skilled in the art. In FIG. 1 the output is shown activating tape recorder 74 for re-recording the information and also being fed to clipping and waveshaping unit 75, and resettable one-shot multivibrator 76, for demodulation. Units 75, and 76 are similar to units 42 and 48 discussed above. The output of unit 76 is fed to relay 78, 79 for activating teletypewriter 80.

Figure 3:
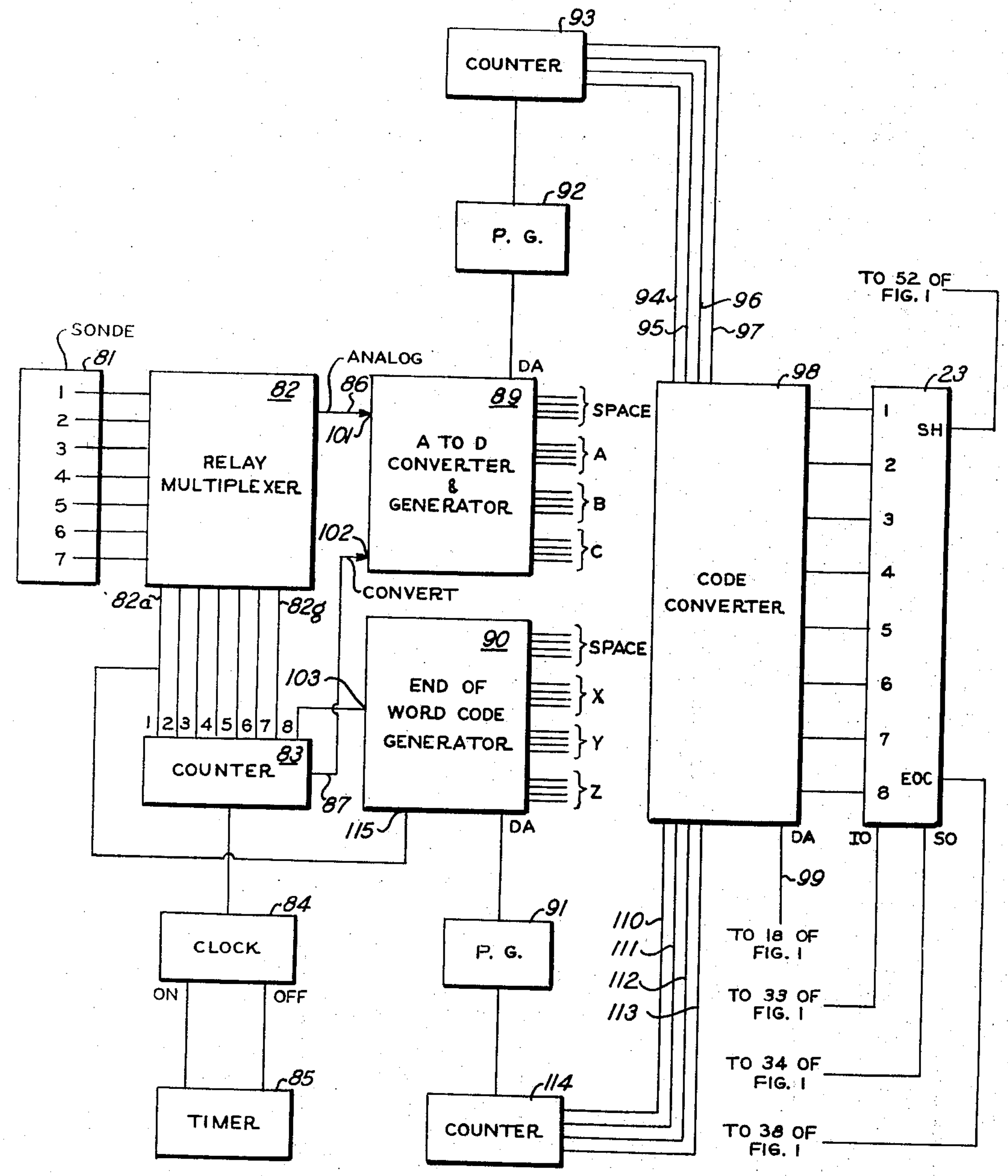
FIG. 3 shows a block diagram of a second embodiment of the invention.

FIG. 3 shows an environmental water monitoring system according to the invention. In this system, a plurality of water measurements are periodically made and the analog signals indicative of the measurement values are converted to a digital word which is recorded on tape. As in the embodiment shown in FIG. 1, the recording is done on a character-by-character basis and as in the system of FIG. 1, the spaces are asserted during recording so as not to produce a velocity modulated recorded signal in the intercharacter gap.

In FIG. 3 sonde 81 is immersed in the water to be monitored. Sonde 81 has a plurality of sensors disposed thereon for measuring different parameters of the water. In the illustrated embodiment seven sensors are shown, six of which may measure pH, temperature, conductivity, dissolved oxygen, turbidity and flow rate and the seventh of which may comprise ion selective electrodes. The particular sensors to be used are known to those skilled in the art, but by way of example the pH sensor may be a modified Beckman electrode, the temperature sensor may be a thermistor unit, the conductivity sensor may be a Hydro Lab DC 5, and the dissolved oxygen sensor may be a membrane-covered passive polarographic probe.

It is to be understood that the exact nature and number of sensors to be used is subject to variance and does not form part of the present invention. Each of the seven sensors in sonde 81 of FIG. 3 is connected to the input of relay multiplexer 82. Relay multiplexer 82, as well as all of the electronic components included in the tape recording system, are surface units and are located either on land or in a vessel. The output wires of sensors 1 to 7 would be located inside a waterproof jacket and would be transmitted to the surface as a cable.

According to the invention, the outputs of all of the sensors are sequentially monitored on a periodic basis, for instance, once every 15 or 30 minutes. Timer 85, which may be a standard electrical or electronic timer is thus arranged to turn clock 84 on every 15 or 30 minutes. Clock 84 is a standard electronic clock such as a free-running multivibrator and provides periodic output pulses to counter 83. Counter 83 has 8 output leads labelled 1 to 8 in FIG. 4 and each successive output pulse of clock 84 causes a successive one of output lines 1 to 8 to be activated. Relay multiplexer 82 is a standard relay multiplexing unit which cause successive ones of sensors 1 to 7 to be connected to output line 86 of the relay multiplexer coincidentally with the activation of inputs 82a to 82g of the multiplexer which are connected respectively to output lines 1 to 7 of counter 83. Thus, when an output signal appears on output line 1 of the counter, the relays in multiplexing unit 82 connect sensor 1 to output line 86, when a signal appears on output 2 of counter 83 sensor 2 is connected to output line 86 and so on. Each of the signals appearing on line 86 is an analog signal, the amplitude of which corresponds to the value of the measurement made by the sensor monitored.

A to D converter and generator 89 is arranged to generate a three-character digital BCD code, represented in FIG. 3 as ABC, indicative of the amplitude of the analog signal fed to it at input 101 when an input is simultaneously received at convert input 102. Counter 83 is arranged to generate an output signal on line 87, each time one of the output lines 1 to 7 of the counter is activated. In this way, A to D converter 89 receives a convert signal on input 102 each time one of the sensors 1 to 7 is connected to line 86. Clock 84 is arranged to have a period which is long enough to insure that the A to D converter converts the analog signal inputted at input 101 and has settled before the input from the next sensor is fed to the converter with the next convert signal at input 102. A to D converter and generator 89 has a code generator therein which gnerates the code for a space signal on the topmost group of output lines thereof each time a convert signal is received at input 102. The space code is outputted to code converter 98 before the characters indicative of the measured value ABC and is used to denote the beginning of a new measurement. After all seven of the sensors have been monitored, it is desired to generate an end-of-measurement signal to indicate that one set of measurements is complete. Output line 8 of counter 83 is thus connected to end-of-word code generator 90 which generates a space code and a set end-of-word code XYZ each time it receives an input signal at input 103. If desired, end-of-word code generator 90 may be integrally contained within the relay multiplexer unit 82. Timer 85 is arranged to generate a signal to turn clock 84 off after the time period allotted for eight pulses. Hence, after each of the seven sensors has been monitored and an end-of-word code has been generated, the sensors are not monitored again until the timer generates an on signal at some later time, for instance in 15 or 30 minutes.

Analog to digital converter 89 is arranged to have a date available terminal DA at which a signal is emitted when data has settled on the output lines of unit 89. The signal on the DA terminal is fed to pulse generator 92 which generates a pulse to activate counter 93, which is a count-to-four counter having output lines 94, 95, 96 and 97. The output lines of counter 93, as well as the output lines of units 89 and 90, are fed to code converter 98. Code converter 98 is a standard unit as known to those skilled in the art for converting from one digital code to another, namely from the BCD output code of units 89 and 90 to the ASCII eight-bit code. Code converter 98 is arranged to convert each of the digital character codes inputted thereto in synchronism with the input of a signal on one of lines 94, 95, 96 and 97. Thus an input signal on line 94 which occurs at the first count of counter 93 causes the space code at the output of unit 89 to be converted to the ASCII code at the output of code converter 98. Character A outputted by unit 89 is converted to the eight-bit digital code when an output signal occurs on line 95 and in a similar fashion characters B and C are converted when outputs appear on lines 96 and 97.

End-of-word code generator 90 also has a data available terminal DA which generates a signal when the digital code signals have settled at its outputs. The signal at the DA output of unit 90 is fed to pulse generator 91 which generates a pulse signal which is fed to counter 114 which is similar to counter 93. Counter 114 generates output signals on lines 110, 111, 112 and 113 which signals are effective to input the space code and the X,Y and Z codes outputted by unit 90 to code coverter 98 for conversion to the eight-bit code. Output line 1 of counter 83 is connected to reset input 115 of end-of-word code generator 90, so that the first count of counter 83 resets generator 103.

Hence, eight-bit digital code signals indicative of each character are fed out of code converter 98 in succession. The order of the characters appearing at the outputs of unit 98 is:

SpA1B1C1SpA2B2C2SpA3B3C3SpA7B7C7SpXYZ where A1B1C1 are characters indicative of the analog value of the measurement taken by sensor 1, A2 B2 C2 are representative of measurements taken by sensor 2 and so on. Hence, a 32-character word indicative of one complete set of measurements is outputted from code converter 98 periodically.

The outputs of code converter 98 are fed to parallel-to-serial converter/generator 23 which is identical to unit 23 shown in FIG. 1. The system of FIG. 1 is used to record the digital information generated by the system of FIG. 3 and a description of the complete operation of the system of FIG. 1 will not be repeated. Code converter 98 is arranged to generate an output signal at data available output DA each time outputs become settled on the output lines of the converter. Line 99 which is connected to output DA is connected to monostable multivibrator 18 of FIG. 1 to generate a pulse, the leading edge of which is operative to start the tape of FIG. 1 moving and to input the data signals to unit 23. Digital signals in series form are fed out of output SO of unit 23 in accordance with clock pulses inputted at input terminal SH. These output pulses are fed through an inverter 34 and are AND gated with the clock pulses in gate 35 so that a carrier wave is recorded on the tape at the position of the spaces. The end-of-character signal generated at output EOC is operative to reset latch 25, 26 to attempt to stop the tape. Whether or not the tape actually stops between characters will depend whether or not there is an output signal at output DA of code converter 98 immediately following the resetting of the latch to set the latch again and start the tape. If such a signal is immediately present, then the tape will be started before it has stopped and the effect will be that the tape never actually stops. Whether or not a signal is present at output DA of code converter 98 immediately after the latch is reset will depend on the speed of conversion of unit 98 as well as the rate at which counter 93 emits output pulses. Since it is desirable to use as little tape as possible, it is desirable for the system to be arranged so that the tape does not stop between characters. The tape, however, will stop at the end of the 32-character word outputted by unit 98 and will not start again until the sampling of the sensors of sonde 81 takes place again. Whenever the tape does stop due to the fact that the spaces and not the marks are asserted no signal will be recorded in the inter-character gap.

Since a carrier signal is recorded , the tape may be played back through the telephone lines directly without the use of a modem as is illustrated in FIG. 1. The demodulation scheme is similar to that shown in FIG. 1 and uses a resettable one-shot multivibrator such as multivibrator 76. At the receiving end of the telephone line, the data could be inputted to a computer, for instance on a time-sharing basis and the computer could be programmed to convert the raw data to engineering and time units and also to list and graph the data if desired. Hence, by the use of the system of the invention, a complete record of water quality versus time may be obtained.

While I have disclosed and described the preferred embodiments of my invention, I wish it understood that I do not intend to be restricted solely thereto, but that I do intend to include all embodiments thereof which would be apparent to one skilled in the art and which come within the spirit and scope of my invention.

I claim:

1. A system for recording information on an incrementally movable magnetic tape on a single channel in response to a data signal comprised of sequentially occurring digital signal groups of mark signals and space signals which groups correspond to characters to be recorded, said signal groups at least some of the time being separated by an interrecord gap time during which a mark signal occurs comprising, recording means responsive to said space signals of said data signal but not to said mark signals for recording a separate signal on said magnetic tape corresponding to each of said space signals of said data signal, means for stopping said magnetic tape during said interrecord gap times when said mark signal occurs.

2. A system according to claim 1 wherein said information is recorded for subsequent playback through the telephone lines, said recording means comprising means for recording a carrier signal having a frequency within the bandpass of said telephone lines in response to the occurrence of each of said space signals.

3. The system of claim 2 wherein said data signal is a standard teletype signal.

4. The system of claim 2 further including means responsive to said data signal for starting said tape before said data signal is recorded.

5. The system of claim 4 wherein said means for recording said carrier signal includes inverter means for inverting the mark and space signals of said data signal, clock means for generating said carrier signal, and coincidence detector means responsive to said inverted signals and said carrier signal for outputting said carrier signal at times corresponding to the occurrences of said space signals of said data signal.

6. The system of claim 2 wherein said data signal is derived by passing the parallel output signals of a keyboard means through a parallel to serial converter means.

7. The system of claim 5 further including serial to parallel converter means, means for inputting said data signal to said serial to parallel converter means, means for starting said tape responsive to the completion of the conversion performed by said serial to parallel converter means, means also responsive to the completion of said conversion for feeding the parallel output signals of said converter means to a parallel to serial converter means, and means for causing said signals to be fed out of said parallel to serial converter means in serial form.

8. The system of claim 7 wherein said means for starting said tape, said means for feeding the parallel output signals of said converter means, and said means for causing said signals to be fed out all include a monostable multivibrator means.

9. The system of claim 8 wherein said means for starting said tape and said means for stopping said tape includes a latch means.

10. A system for recording and playing back information in a single channel on an incrementally movable magnetic tape corresponding to a data signal comprised of sequentially occurring digital signal groups of mark signals and space signals which groups correspond to characters to be recorded, said signal groups at least some of the time being separated by an inter-record gap time during which a mark signal occurs comprising, recording means responsive to said space signals of said data signal but not to said mark signals for recording a separate carrier signal having a carrier frequency on said magnetic tape in response to the occurrence of each of said space signals of said data signal, means for stopping said magnetic tape during said inter-record gap times when said mark signal occurs, means for tranducing the recorded information on said tape to an electrical playback signal and means for reconstituting said original data signal from said electrical playback signal.

11. The system of claim 10 wherein said means for reconstituting said original data signal includes means for generating space signals in response to carrier signal portions of said electrical playback signal.

12. The system of claim 11 wherein said means for generating space signal includes resettable one-shot multivibrator means having a period of a longer duration than the period of said carrier signal.

13. The system of claim 12 wherein said means for reconstituting further includes clipping and wave shaping means.

14. The system of claim 2 wherein said data signal is generated by a liquid monitoring apparatus, said apparatus including means for periodically sampling liquid in which a part of said apparatus is immersed, means for generating analog signals representative of the parameters of said liquid sampled, and means for converting said analog signal to said digital data signal.

15. The system of claim 14 wherein said means for generating analog signals includes a plurality of transducer means responsive to the parameters of said liquid and said means for sampling includes means for periodically connecting the output of each of said transducer means to said means for converting.

16. The system of claim 15 wherein said means for sampling includes clock means and counter means.

17. The system of claim 16 wherein said part of said appartus which is immersed in said liquid comprises a sonde to which transducer means are attached.

18. The system of claim 14 in combination with playback apparatus which comprises means for transducing the information recorded on said tape to an electrical playback signal and means including resettable one-shot multivibrator means for reconstituting said original data signal from said playback signal.

19. A method of recording information on an incrementally movable magnetic tape in a single channel corresponding to a data signal comprised of sequentially occurring digital signal groups of mark signals and space signals which groups correspond to characters to be recorded, said signal groups at least some of the time being separated by an inter-record gap time during which a mark signal occurs, comprising, recording a separate signal on said magnetic tape in response to the occurrence of each of said space signals of said data signal, stopping said magnetic tape during said inter-record gap times when said mark signal occurs.

20. The method of claim 19 wherein said information is recorded for subsequent playback through the telephone lines and said step of recording comprises recording a carrier signal having a frequency within the band pass of said telephone lines in response to the occurrence of each of said space signals.

* * * * *